US00RE50091E

(19) United States
(12) Reissued Patent
Panusopone et al.

(10) Patent Number: US RE50,091 E
(45) Date of Reissued Patent: Aug. 20, 2024

(54) OFFSET TEMPORAL MOTION VECTOR PREDICTOR (TMVP)

(71) Applicant: ARRIS Enterprises LLC, Suwanee, GA (US)

(72) Inventors: Krit Panusopone, San Diego, CA (US); Seungwook Hong, San Diego, CA (US); Limin Wang, San Diego, CA (US)

(73) Assignee: ARRIS Enterprises LLC, Suwanee, GA (US)

(21) Appl. No.: 17/487,450

(22) Filed: Sep. 28, 2021

Related U.S. Patent Documents

Reissue of:
(64) Patent No.: 10,432,960
Issued: Oct. 1, 2019
Appl. No.: 15/726,078
Filed: Oct. 5, 2017

U.S. Applications:
(60) Provisional application No. 62/404,573, filed on Oct. 5, 2016.

(51) Int. Cl.
*H04N 19/513* (2014.01)
*H04N 19/176* (2014.01)
(Continued)

(52) U.S. Cl.
CPC ..... *H04N 19/513* (2014.11); *H04N 19/52* (2014.11); *H04N 19/521* (2014.11); *H04N 19/523* (2014.11); *H04N 19/176* (2014.11)

(58) Field of Classification Search
None
See application file for complete search history.

(56) References Cited

U.S. PATENT DOCUMENTS 10,200,709 B2 * 2/2019 Chen ..... H04N 19/70
2013/0003851 A1 * 1/2013 Yu ..... H04N 19/105 375/240.16

(Continued)

OTHER PUBLICATIONS

G. Sullivan, et al., "Standardized Extensions of High Efficiency Video Coding (HVEC)", IEEE Journal of Selected Topics in Signal Processing, Oct. 1, 2013, pp. 1001-1016.

(Continued)

*Primary Examiner* — Roland G Foster
(74) *Attorney, Agent, or Firm* — Chernoff, Vilhauer, McClung & Stenzel, LLP

(57) ABSTRACT

An improved method for temporal motion vector prediction for inter block HEVC is provided that relies on a block translational model. The method adds an offset to a temporal motion vector predictor (TMVP) to improve prediction accuracy. The method first designates a current prediction block as an area for motion compensation where all the pixels inside the prediction block perform identical translation temporally using motion vectors MVs. A coordinate offset is then derived for a current prediction block from the MVs of its spatially neighboring blocks. The offset TMVP is then defined for the current prediction block as the MV of an offset block which is in the geometrical location of the current prediction block coordinate plus the coordinate offset in a specified temporal reference picture. The offset TMVP is then used to code MVs.

1 Claim, 3 Drawing Sheets

(51) Int. Cl.
*H04N 19/52* (2014.01)
*H04N 19/523* (2014.01)

(56) References Cited

U.S. PATENT DOCUMENTS

| | | | | |
|---|---|---|---|---|
| 2013/0195182 | A1* | 8/2013 | Kung | H04N 19/46 375/240.12 |
| 2017/0347096 | A1* | 11/2017 | Hong | H04N 19/159 |
| 2018/0084260 | A1* | 3/2018 | Chien | H04N 19/105 |
| 2018/0184110 | A1* | 6/2018 | Panusopone | H04N 19/107 |

OTHER PUBLICATIONS

J. Guoxin, et al. "Motion estimation and compensation for fish eye warped video", 2015 IEEE International Conference in Image Processing (ICIP), Sep. 27, 2015, pp. 2751-2755.
PCT International Search Report & Written Opinion, RE: Application No. PCT/US2017/055379, dated Jan. 23, 2018.
M. Karczewicz, et al., "Study of coding efficiency improvements beyond HEVC", 113th MPEG Meeting (Motion picture Expert Group or ISO/IEC JTC1/SC29/WG11, No. m37102, Oct. 15, 2015.

* cited by examiner

Using the neighboring PU blocks located in a first three positions in a merge candidate list for the current PU block to calculate the offset TMVP, including the three neighboring PU blocks, the left (L), the above (A), and the above-left (AL) — 500

↓

Deriving the current PU block as a median of motion vectors of these neighbors, as follows: — 502

$$dx = \text{median}(Lx, ALx, Ax)$$
$$dy = \text{median}(Ly, ALy, Ay)$$

wherein Lx, ALx, Ax are the x component of motion vectors of Left neighbor, Above-left neighbor, and Above neighbor, respectively, and wherein Ly, ALy, Ay are the y component of Left neighbor, Above-left neighbor, and Above neighbor, respectively.

FIG. 5

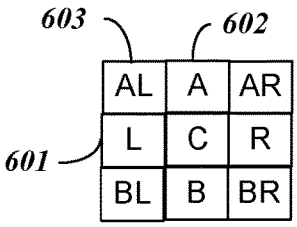

FIG. 6

OFFSET TEMPORAL MOTION VECTOR PREDICTOR (TMVP)

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM FOR PRIORITY

[This Application claims priority under 35 U.S.C. § 119(e) from earlier filed U.S. Provisional Application Ser. No. 62/404,573 filed on Oct. 5, 2016 and incorporated herein by reference in its entirety.] *This is a reissue application of U.S. patent application Ser. No. 15/726,078 filed on Oct. 5, 2017, now issued as U.S. Pat. No. 10,432,960, which claims the benefit of U.S. Provisional Patent Application Ser. No. 62/404,573 filed on Oct. 5, 2016. The entire disclosures of the above applications are hereby incorporated by reference herein for all purposes.*

BACKGROUND

Technical Field

The present invention relates to coding using High Efficiency Video Coding (HEVC or H-265). More particularly, the present system relates to motion vector prediction for coding of HEVC blocks.

Related Art

State of the art video quality is achieved today by performing complex High Efficiency Video Coding (HEVC) video encoding with the video pictures broken into macroblocks. Motion vector determination enables more efficient coding of the blocks making up a picture. The HEVC coding standard (also called H.265) is a coding standard promulgated by the ISO/IEC MPEG standardization organizations. HEVC supports resolutions higher than "high definition," which means pixels may be represented by a larger number of bits than the high definition pictures. For example, 4K resolutions may include images that are 4,000 pixels wide compared to high definition images that are 1920 pixels wide.

Temporal motion prediction is an effective method to increase the coding efficiency and provides high compression necessary for HEVC. HEVC uses a translational model for temporal motion prediction. According to the translational model, a prediction signal for a given current unit in a current picture is generated from a corresponding reference unit in a reference picture. The coordinates of the reference unit are given by a motion vector that describes the translational motion along horizontal (x) and vertical (y) directions that would be added/subtracted to/from the coordinates of the current unit. A decoder needs the motion vector to decode the compressed video.

HEVC relies on a block based translational model for its temporal prediction (inter coding) in order to keep complexity and overhead bits low. For inter coding block, HEVC designates a prediction block as an area for motion compensation where all the pixels inside the prediction block performs identical translation temporally using either one or two motion vectors (MV). Motion vector prediction is used to code motion vector(s) to reduce the overhead bits for motion vector signaling. Motion estimation or prediction is a process of determining a motion vector (MV) for a current unit of video. The motion estimation process searches for a best match prediction for a current unit block of video (e.g., a prediction block) over reference pictures. For a current inter block, its motion vector predictor can be derived from the motion vectors of its spatially neighboring blocks and/or the temporally collocated block.

It is desirable to provide improvements in motion vector prediction accuracy to make HEVC coding more efficient.

SUMMARY

Embodiments of the invention provide a method for temporal motion vector prediction for inter block HEVC that relies on a block translational model, enabling more efficient encoding. The method adjusts the coordinate of a temporal motion vector predictor (TMVP) by adding an offset to improve prediction accuracy. The modified coordinate provides better prediction when there is significant object motion between the frames In particular, the method begins by designating a current prediction block as an area for motion compensation using HEVC where all the pixels inside the prediction block perform identical translation temporally using either one or more motion vectors MVs. A coordinate offset is derived for a current prediction block from the MVs of its spatially neighboring blocks. An offset TMVP is then defined for the current prediction block as the MV of an offset block which is in the geometrical location of the current prediction block coordinate plus the coordinate offset in a specified temporal reference picture. The offset TMVP can be used to code MVs to reduce the overhead bits for motion vector signaling. Additionally, the offset TMVP can be used in motion vector predictor calculation of merge mode such as alternative temporal motion vector prediction (ATMVP), or spatial temporal motion vector prediction (STMVP).

The offset TMVP in one embodiment is specifically defined assuming that the current prediction block is at the position of coordinate (x, y) in the current picture. the coordinate offset is added by doing the following:

adding a coordinate offset of (dx, dy) to the coordinate (x,y) to give the offset TMVP as $$(x',y')=(x,y)+(dx,dy)=(x+dx,y+dy).$$

In an explicit approach for encoding using the TMVP offset according to embodiments of the present invention, syntax elements expressing the offset are used. One offset can be shared for multiple prediction blocks.

In an implicit approach for encoding using the TMVP offset according to embodiments of the present invention, motion vectors of neighboring prediction blocks to the current prediction block are used to calculate the offset for the TMVP. In one example, the neighboring prediction blocks located in a first three positions in a merge candidate list for the current prediction block are used in calculating the TMVP offset. In another example, the three neighboring prediction blocks, the left (L), the above (A), and the above-left (AL), are used for computing the TMVP offset. One possible example for calculating the TMVP offset for the current prediction block is to use a median of motion vectors of these neighbors, as follows:

$$dx=median(Lx,ALx,Ax)$$

$$dy=median(Ly,ALy,Ay)$$

wherein Lx, ALx, Ax are the x component of motion vectors of Left neighbor, Above-left neighbor, and Above neighbor, respectively, and wherein Ly, ALy, Ay are the y component of Left neighbor, Above-left neighbor, and Above neighbor, respectively.

An added TMVP offset mode can be used in one embodiment of the present invention that can be turned on and off with either the explicit or implicit means. Implicit signaling for turn on and turn off of the offset TMVP mode can be based on coding information of neighboring blocks. Explicit signaling for turn on and turn off in the offset TMVP mode can be thru a flag at a CU, slice or sequence level.

BRIEF DESCRIPTION OF THE DRAWINGS

Further details of the present invention are explained with the help of the attached drawings in which:

FIG. 5 is a flowchart showing calculation of the TMVP offset using the neighboring prediction blocks located in a first three positions in a merge candidate list for the current prediction block; and FIG. 6 illustrates the three neighboring prediction blocks used to calculate the TMVP offset in FIG. 5.

DETAILED DESCRIPTION

Figure 1:
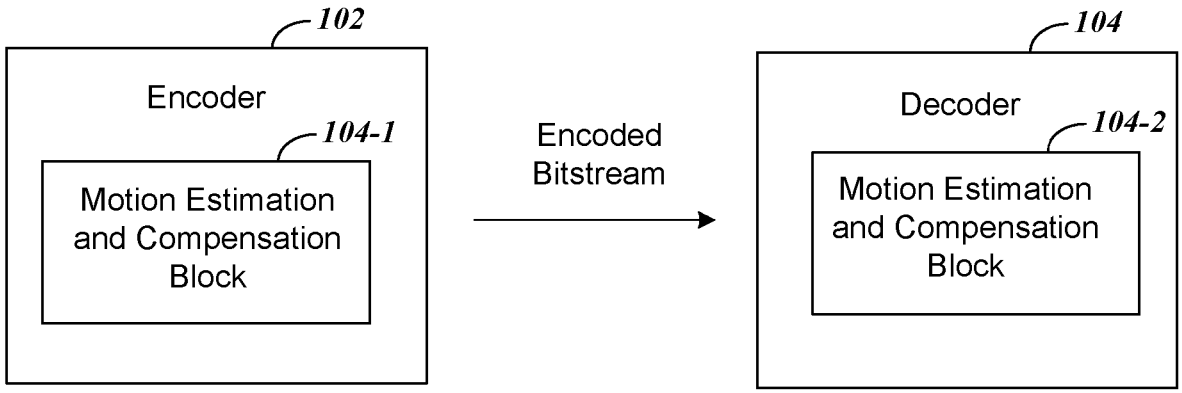
FIG. 1 shows a simplified system for encoding and decoding video according to embodiments of the present invention.

FIG. 1 shows a simplified system for encoding and decoding video according to embodiments of the present invention. System includes an encoder 102 and a decoder 104. Encoder 102 and decoder 104 may use a video coding standard to encode and decode video, such as HEVC. Specifically, encoder 102 and decoder 104 may use syntax elements from the HEVC range extension. Also, other elements of encoder 102 and decoder 104 may be appreciated.

Encoder 102 and decoder 104 perform temporal prediction through motion estimation and motion compensation. Motion estimation is a process of determining a motion vector (MV) for a current unit of video. For example, the motion estimation process searches for a best match prediction for a current unit block of video (e.g., a prediction block) over reference pictures. The best match prediction is described by the motion vector and associated reference picture ID. Also, a reference unit in a B picture may have up to two motion vectors that point to a previous reference unit in a previous picture and a subsequent reference unit in a subsequent reference picture in the picture order. Motion compensation is then performed by subtracting a reference unit pointed to by the motion vector from the current unit of video. In the case of bi-prediction, the two motion vectors point to two reference units, which can be combined to form a combined bi-directional reference unit.

To perform motion estimation and compensation, encoder 102 and decoder 104 include motion estimation and compensation blocks 104-1 and 104-2, respectively. For bi-directional prediction, the motion estimation and compensation blocks 104-1 and 104-2 can use a combined bi-directional reference unit in the motion compensation process for the current unit. Syntax elements are further used in the motion prediction process.

For the encoder 102 and decoder 104 of FIG. 1, embodiments of the present invention contemplate that software to enable them to perform functions described to follow for the present invention is provided in a memory. The encoder 102 and decoder 104 are further contemplated to include one or more processors that function in response to executable code stored in the memory to cause the processor to perform the functions described.

Figure 2:
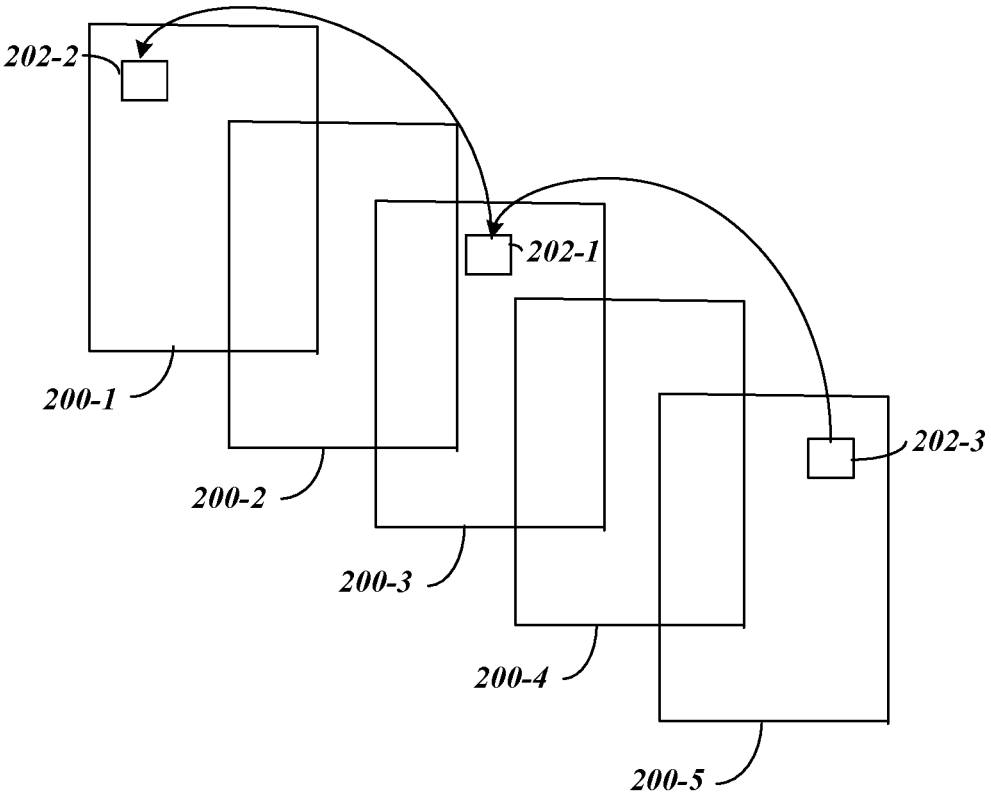
FIG. 2 illustrates video pictures with reference unit blocks for motion estimation and compensation.

FIG. 2 illustrates video pictures with reference unit blocks for motion estimation and compensation. The video includes a number of pictures 200-1-200-5. A current picture is shown at 200-3 and includes a current unit of video 202-1. Current unit 202-1 may be bi-predicted using reference unit blocks from reference pictures in other pictures, such as a previous picture 200-1 in the picture order and a subsequent picture 200-5 in the picture order. Picture 200-1 includes a reference unit 202-2 and picture 200-5 includes a reference unit block 202-3, both of which can be used to predict current unit block 202-1.

Once the current picture is established and the reference unit blocks are determined, motion estimation and compensation block 104-1 can determine motion vectors that represent the location of reference unit blocks 202-2 and 202-3 with respect to current unit block 202-1. Then, motion estimation and compensation block 104-1 calculates a difference between the combined reference unit block and the current unit block 202-1. Encoder 102 outputs the motion vectors in an encoded bitstream that is sent to decoder 104.

Decoder 104 receives the encoded bitstream and can reconstruct the pictures of the video. Decoder 104 may reconstruct reference unit blocks 202-2 and 202-3 from the encoded bitstream prior to decoding current unit block 202-1. Also, decoder 104 decodes the motion vectors for current unit block 202-1. Then, in decoder 104, motion estimation and compensation block 104-2 are used to reconstruct the current unit block 202-1. The motion estimation and compensation block 104-2 uses the motion vectors to locate reconstructed reference unit blocks 202-2 and 202-3 and reconstruct the current unit block 202-1.

Motion vector prediction is used in motion vector coding process to exploit correlation between the coding motion vector and its selected predictor. Due to the characteristics of natural video, object generally moves in a smooth, linear trajectory from frame to frame. This behavior makes the motion vector of the temporally collocated block as a powerful motion vector predictor for a current block, and it is hence used in HEVC motion vector coding.

In HEVC, for a current prediction block in a current picture, the motion vector of its temporal collocated prediction block, which is in the same geometrical location in a specified temporal reference picture as the current prediction block in the current picture, is defined as the temporal motion vector predictor (TMVP) for the current prediction block. Specifically, the collocated block has the same spatial coordinate (x,y) in the reference picture as the current prediction block (x,y) in the current picture. The collocated position can however be suboptimal when there is significant object motion between the frames. In such case, the collocated position may represent a different object and its motion vector is not a useful TMVP.

Accordingly, embodiments of the present invention introduce a way to improve TMVP effectiveness, especially when there are a lot of movements between the frames. Instead of using the same coordinate in the reference picture as the coding prediction block in the current picture, embodiments of the present invention add a coordinate offset to the coordinate for the TMVP location.

Figure 3:
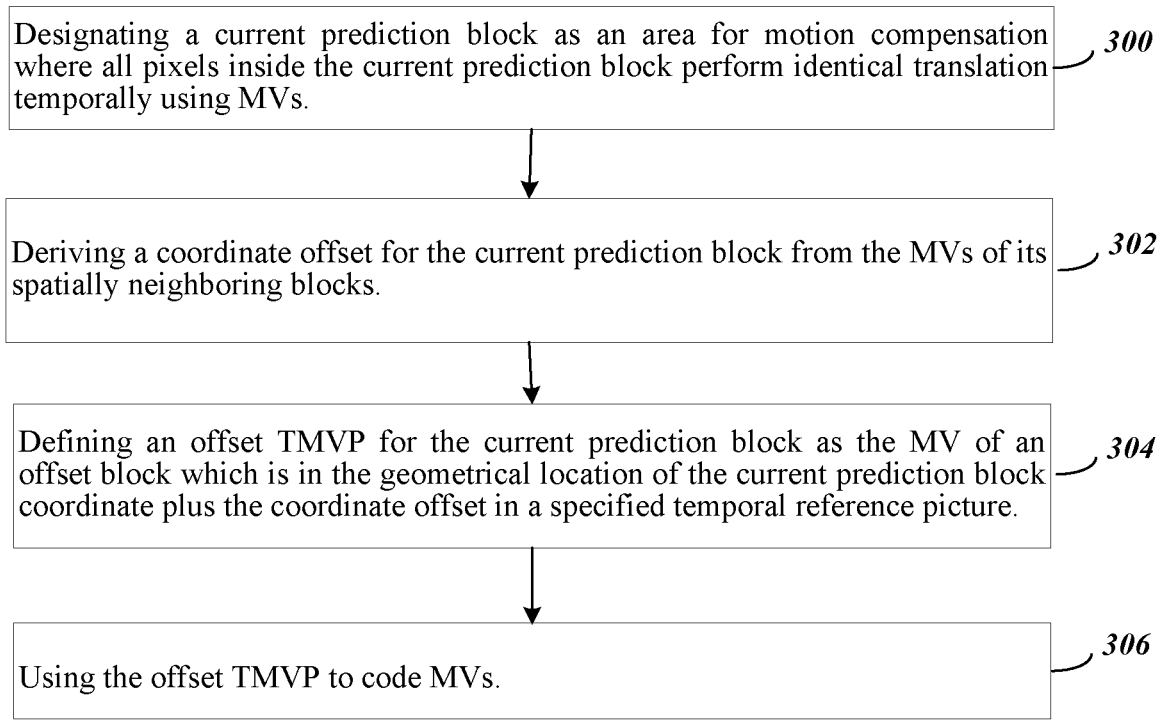
FIG. 3 is a flowchart showing steps of a method of adding an offset to a TMVP according to embodiments of the present invention.

FIG. 3 is a flowchart showing steps of a method of adding an offset to a TMVP according to embodiments of the present invention. The method uses a block translational model and begins in step 300 with designating a current prediction block as an area for motion compensation where all the pixels inside the prediction block perform identical translation temporally using either one or more motion vectors (MVs). In the next step 302, a coordinate offset is derived for the current prediction block from the MVs of its spatially neighboring blocks. In step 304, the offset TMVP is defined for the current prediction block as the MV of an offset block which is in the geometrical location of the current prediction block coordinate plus a coordinate offset computed in step 302 in a specified temporal reference picture. Finally, in step 306 the MV prediction with the offset TMVP is used to code MVs.

Figure 4:
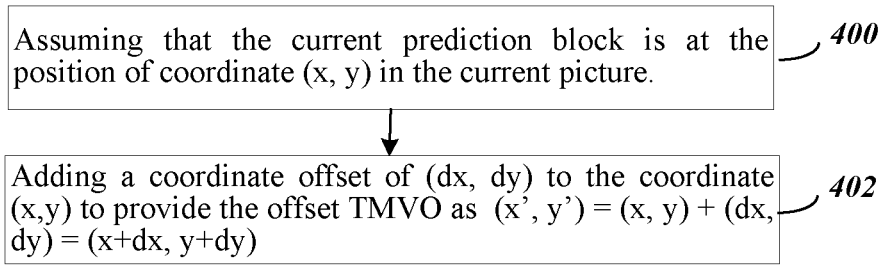
FIG. 4 is a flowchart showing specifics of the steps to further define the offset TMVP.

FIG. 4 is a flowchart showing specifics of the steps to further define the offset TMVP. First in step 400, an assumption is made that the current prediction block is at the position of coordinate (x, y) in the current picture. Next, in step 402 a coordinate offset of (dx, dy) is added to the coordinate (x,y) to define the offset TMVP (x', y') as follows:

$$(x',y')=(x,y)+(dx,dy)=(x+dx,y+dy).$$

The TMVP offset (dx, dy) can be determined explicitly or implicitly. Details of the two approaches are described to follow.

For explicit approach, syntax elements in coding bitstream can be used to indicate TMVP offset values. To reduce the overhead bits, one offset may be shared for multiple prediction blocks and coded with coarser granularity than the final fractional motion vector accuracy.

For implicit approach, a motion vector derivation method is specified so that decoder can repeat the same process and be able to regenerate the same TMVP offset. In this simplified approach, the motion vectors of neighboring prediction blocks are used to calculate the offset for TMVP. Motion vectors of neighboring prediction blocks in this approach are normalized to compensate for the difference in temporal distances between references used among these prediction blocks.

FIG. 5 is a flowchart showing calculation of the coordinate offset using the neighboring prediction blocks. FIG. 6 illustrates the three neighboring prediction blocks used to calculate the coordinate offset for the current block (C) in FIG. 5. The prediction blocks in FIG. 6 include the above left (AL), above (A), above right (AR), left (L), right (R), below left (BL), below (B), and below right (AR).

In a first step 500 of FIG. 5, the three neighboring prediction blocks are used for the current prediction block to calculate the offset TMVP. The three neighboring prediction blocks include the left (L) 601, the above (A) 602, and the above-left (AL) 603. Next, in step 502, the current prediction block is derived as a median of motion vectors of these neighbors, as follows:

$$dx=median(Lx,ALx,Ax)$$

$$dy=median(Ly,ALy,Ay)$$

wherein Lx, ALx, Ax are the x component of motion vectors of Left neighbor, Above-left neighbor, and Above neighbor, respectively, and wherein Ly, ALy, Ay are the y component of Left neighbor, Above-left neighbor, and Above neighbor, respectively.

An added TMVP offset mode can be used in one embodiment of the present invention that can be turned on and off with either the explicit or implicit means. Implicit signaling for turn on and turn off of the offset TMVP mode can be based on coding information of neighboring blocks. Explicit signaling for turn on and turn off in the offset TMVP mode can be thru a flag at a CU, slice or sequence level.

Although the present invention has been described above with particularity, this was merely to teach one of ordinary skill in the art how to make and use the invention. Many additional modifications will fall within the scope of the invention as that scope is defined by the following claims.

What is claimed:

[1. A method of temporal motion vector prediction for inter block coding in High Efficiency Video Coding (HEVC) that relies on a block based translational model, the method comprising:

designating a current prediction block as an area for motion compensation using HEVC where all the pixels inside the current prediction block perform identical translation temporally using either one or more motion vectors MVs;

deriving a coordinate offset for the current prediction block from the MVs of its spatially neighboring blocks;

defining an offset of a temporal motion vector predictor (TMVP) for the current prediction block as the MV of an offset block which is in the geometrical location of the current prediction block coordinate plus the coordinate offset in a specified temporal reference picture; and using the offset TMVP to code MVs, wherein the motion vectors of neighboring prediction blocks to the current prediction block are used to calculate the offset for the TMVP, wherein the neighboring prediction blocks located in a first three positions in a merge candidate list for the current prediction block are used in calculating the offset for the TMVP, wherein the three neighboring prediction blocks comprise a left (L), an above (A), and an above-left (AL), wherein with the three neighboring prediction blocks, the offset for the TMVP for the current prediction block is derived as median of motion vectors of these neighbors, as follows:

$$dx=median\ (Lx, ALx, Ax)$$

$$dy=median\ (Ly, ALy, Ay)$$

wherein Lx, ALx, Ax are the x component of motion vectors of Left neighbor, Above-left neighbor, and Above neighbor, respectively, and wherein Ly, ALy, Ay are the y component of Left neighbor, Above-left neighbor, and Above neighbor, respectively.]

[2. The method of claim 1, wherein in the step of defining the offset TMVP, the offset TMVP is further defined by the steps comprising:

assuming that the current prediction block is at the position of coordinate (x, y) in the current picture; and adding a coordinate offset of (dx, dy) to the coordinate (x,y) to provide the offset TMVP (x',y') as $$(x', y') =(x, y) +(dx, dy) =(x+dx, y+dy).$$]

[3. The method of claim 1, wherein syntax elements are required in coding a bitstream to indicate values for the offset TMVP.]

[4. The method of claim 1, wherein one offset is shared for multiple prediction blocks or coded with coarser granularity than the final fractional motion vector accuracy.]

[5. The method of claim 1, wherein motion vectors of neighboring prediction blocks are normalized to compensate for the difference in temporal distances between references used among the neighboring prediction blocks.]

[6. The method of claim 1, wherein the step of using MV prediction with the TMVP to code MVs, comprises:

providing a TMVP offset mode that can be turned on or off, wherein in the on mode the offset TMVP with the added offset is used to code MVs, and in the off mode a TMVP without the added offset is used to code MVs, wherein an explicit signal is provided for turn on and turn off of the offset TMVP mode using a flag provided at a CU, slice or sequence level.]

*7. A method of temporal motion vector prediction for inter block coding of video within a bitstream that relies on a block based translational model, the method comprising:*

*(a) designating a current prediction block as an area of said video for motion compensation where all the samples defined by the current prediction block perform identical translation temporally using at least one motion vector;*

*(b) deriving a coordinate offset for the current prediction block from at least one motion vector of a set of spatially neighboring blocks relative to the current prediction block;*

*(c) wherein a selection of said set of spatially neighboring blocks is based upon a merge candidate list for said current prediction block;*

*(d) wherein said merge candidate list includes a left neighboring block (L), and an above neighboring block (A), where said merge candidate list includes an ordered list of candidate neighboring blocks, where said left neighboring block (L) is directly left of and aligned with the current prediction block, where said above neighboring block (A) is directly above of and aligned with the current prediction block;*

*(e) wherein said left neighboring block (L), and said above neighboring block (A), are included within two of a first position, a second position, and a third position of the ordered list of candidate neighboring bocks of said merge candidate list, where said left neighboring block (L) is included within one of said first position, the second position, and third position, where said above neighboring block (A) is included within a different one of said first position, the second position, and third position than said left neighboring block (L);*

*(f) defining an offset temporal motion vector predictor (TMVP) for the current prediction block as the coordinate offset based upon the at least one motion vector of an offset block selected from the merge candidate list further based upon another coordinate offset in a specified temporal reference picture that is in a temporally different picture than said current prediction block; and*

*(g) decoding said current prediction block based upon said offset TMVP.*

* * * * *